United States Patent
Grissino et al.

(10) Patent No.: US 8,382,432 B2
(45) Date of Patent: Feb. 26, 2013

(54) COOLED TURBINE RIM SEAL

(75) Inventors: Alan Scott Grissino, Amesbury, MA (US); Jeremy Stephen Wigon, Topsfield, MA (US); Gianni Emanuolo Busso, Watertown, MA (US)

(73) Assignee: General Electric Company, Schenectady, NY (US)

( * ) Notice: Subject to any disclaimer, the term of this patent is extended or adjusted under 35 U.S.C. 154(b) by 577 days.

(21) Appl. No.: 12/719,222

(22) Filed: Mar. 8, 2010

(65) Prior Publication Data

US 2011/0217158 A1    Sep. 8, 2011

(51) Int. Cl.
*F01D 5/08* (2006.01)
*F01D 5/18* (2006.01)

(52) U.S. Cl. .......... 416/95; 416/96 R; 416/198 R; 415/115; 415/175; 415/178; 415/199.5

(58) Field of Classification Search .......... 415/115, 415/175, 178, 199.5; 416/95, 96 R, 198 A
See application file for complete search history.

(56) References Cited

U.S. PATENT DOCUMENTS

| | | | |
|---|---|---|---|
| 4,554,789 A | 11/1985 | Napoli et al. | |
| 5,143,512 A | 9/1992 | Corsmeier et al. | |
| 5,232,339 A | 8/1993 | Plemmons et al. | |
| 6,220,815 B1 | 4/2001 | Rainous et al. | |
| 6,283,712 B1 | 9/2001 | Dziech et al. | |
| 6,361,277 B1 * | 3/2002 | Bulman et al. | 416/96 R |
| 6,655,920 B2 * | 12/2003 | Beutin et al. | 416/198 A |
| 6,708,482 B2 * | 3/2004 | Seda | 60/226.1 |
| 6,832,891 B2 | 12/2004 | Aschenbruck et al. | |
| 7,926,289 B2 * | 4/2011 | Lee et al. | 416/97 R |
| 8,092,152 B2 * | 1/2012 | Dejaune et al. | 415/115 |
| 2009/0004006 A1 | 1/2009 | Dejaune et al. | |
| 2009/0047124 A1 | 2/2009 | Glahn et al. | |

FOREIGN PATENT DOCUMENTS

| | | |
|---|---|---|
| EP | 1264964 A1 | 12/2002 |
| EP | 2009235 A1 | 12/2008 |

OTHER PUBLICATIONS

European Search Report and Opinion issued Jun. 29, 2011 in connection with corresponding EP Application No. 11151753.8.

* cited by examiner

*Primary Examiner* — Igor Kershteyn
(74) *Attorney, Agent, or Firm* — General Electric Company; Steven J. Rosen; David J. Clement

(57) ABSTRACT

A rim seal assembly includes an annular seal element circumscribing an engine centerline or axis and mounted on an annular platform including a radially inwardly extending annular platform flange disposed between and connected to forward and aft flanges at distal ends of forward and aft annular elements respectively. Annular forward and aft outer rim cavities radially disposed between the forward and aft annular elements and the platform are axially separated by the platform flange. Cooling slots extend radially across axially facing forward and aft surfaces of the forward and aft flanges. The platform flange and the forward and aft flanges are bolted together. The annular seal element may include seal teeth in sealing relationship with an annular seal land such as in a labyrinth seal. The rim seal assembly may be incorporated in a low pressure turbine use a compressor as a source of cooling air.

20 Claims, 5 Drawing Sheets

COOLED TURBINE RIM SEAL

GOVERNMENT INTERESTS

This invention was made with government support under government contract No. F33657-00-D-0048 awarded by the Department of Defense. The government has certain rights to this invention.

BACKGROUND OF THE INVENTION

1. Field of the Invention

The invention relates to aircraft gas turbine engine rim seals and, particularly, for labyrinth seals having rotating elements supported by flanges of adjacent disks sealing against stationary elements.

2. Description of Related Art

A gas turbine engine of the turbofan type generally includes a fan, a core engine, and a low pressure power turbine. The core engine includes a compressor, a combustor and a high pressure turbine in a serial flow relationship. The compressor and high pressure turbine of the core engine are interconnected by a high pressure shaft. The compressor, turbine, and shaft essentially form the high pressure rotor. The compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan via a low pressure shaft, all of which form the low pressure rotor. The low pressure shaft extends through the high pressure rotor.

Some gas turbine engines have low pressure turbines in which the stages include disks that are bolted together by arm flanges at distal ends of arms extending from the disks. Disposed between the arm flanges is a seal flange supporting an annular platform with labyrinth seal teeth extending radially outwardly therefrom. The seal teeth cooperate with a static seal land mounted at a radially inner end of turbine vane assembly forming a labyrinth seal. Labyrinth seals are used to control and prevent leakage flow from a primary hot flowpath through the turbine. However, some leakage does occur, and migrates through the labyrinth seal downstream to lower pressure regions. In the turbine section, this leakage air is made extremely hot by hot gases from the products of combustion, as the primary airflow expands through the turbine towards the exit of the engine. This high temperature air in radially outer rim cavities between the annular platform and the arms is extremely undesirable, having adverse effect on rotating metal disks and other parts of the gas turbine engine. It is highly desirable to provide relatively cooler airflow into the rim cavities surrounding the upper disk regions and labyrinth seal teeth.

SUMMARY OF THE INVENTION

A rim seal assembly includes an annular seal element circumscribing an engine centerline or axis and mounted on an annular platform, an annular platform flange extending radially inwardly from the platform and disposed between and connected to forward and aft flanges at distal ends of forward and aft annular elements respectively. Annular forward and aft outer rim cavities radially disposed between the forward and aft annular elements and the platform are axially separated by the platform flange. Cooling slots extend radially across axially facing forward and aft surfaces of the forward and aft flanges.

In an exemplary embodiment of the rim seal assembly, the platform flange and the forward and aft flanges are be bolted together. The annular seal element may include seal teeth in sealing relationship with an annular seal land.

The forward and aft annular elements may be in a high pressure rotor or a low pressure rotor with annular forward and aft outer rim cavities radially disposed between the forward and aft annular elements and the platform and axially separated by the platform flange.

A gas turbine engine turbine disk assembly includes at least one pair of adjacent first and second rotor disks connected by disk forward and aft spacer arms attached to the adjacent first and second rotor disks respectively. At least one rim seal assembly includes an annular seal element circumscribing an engine centerline or axis and mounted on an annular platform with an annular platform flange extending radially inwardly from the platform. The platform flange is disposed between and connected to forward and aft flanges at distal ends of the forward and aft spacer arms respectively. Annular forward and aft outer rim cavities radially are disposed between the forward and aft spacer arms and the platform and are axially separated by the platform flange. Cooling slots extending radially across axially facing forward and aft surfaces of the forward and aft flanges.

A more particular embodiment of the gas turbine engine turbine disk assembly includes a plurality of rotor disks and each of the rotor disks includes a web extending radially outwardly from a hub to a disk rim. The plurality of rotor disks includes at least one pair of adjacent first and second rotor disks are connected by disk forward and aft spacer arms attached to the adjacent first and second rotor disks respectively. Turbine blades extend radially outwardly from the disk rim of the adjacent first and second rotor disks, a row of vanes extend radially inwardly from a case and are disposed axially between the turbine blades of the adjacent first and second rotor disks. An annular seal land is mounted to a radially inner end of the row of vanes. At least one rim seal assembly includes an annular seal element circumscribes an engine centerline or axis and is mounted on an annular platform. The annular seal element is in sealing relationship with the annular seal land. An annular platform flange extends radially inwardly from the platform, the platform flange is disposed between and connected to forward and aft flanges at distal ends of the forward and aft spacer arms respectively. Annular forward and aft outer rim cavities are radially disposed between the forward and aft spacer arms and the platform and are axially separated by the platform flange. Cooling slots extend radially across axially facing forward and aft surfaces of the forward and aft flanges. A bore disposed radially inwardly of the hub and the forward and aft spacer arms is in flow communication with a source of cooling air and the turbine blades and the row of vanes extend radially across a low pressure turbine primary flowpath. The source of cooling air may be a compressor.

A gas turbine engine includes in downstream serial flow relationship, a fan, a compressor, a combustor, a high pressure turbine, and a low pressure turbine. Each of a plurality of rotor disks in the low pressure turbine includes a web extending radially outwardly from a hub to a disk rim. The plurality of rotor disks includes at least one pair of adjacent first and second rotor disks that are connected by disk forward and aft spacer arms attached to the adjacent first and second rotor disks respectively. Turbine blades extend radially outwardly from the disk rim of the adjacent first and second rotor disks and a row of vanes extend radially inwardly from a case and disposed axially between the turbine blades of the adjacent first and second rotor disks. An annular seal land is mounted to a radially inner end of the row of vanes. At least one rim seal assembly includes an annular seal element circumscribing an engine centerline or axis and is mounted on an annular platform. The annular seal element is in sealing relationship with the annular seal land. An annular platform flange extends radially inwardly from the platform and is disposed between and connected to forward and aft flanges at distal ends of the forward and aft spacer arms respectively. Annular forward and aft outer rim cavities are radially disposed between the forward and aft spacer arms and the platform and are axially separated by the platform flange. Cooling slots extend radially across axially facing forward and aft surfaces of the forward and aft flanges.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
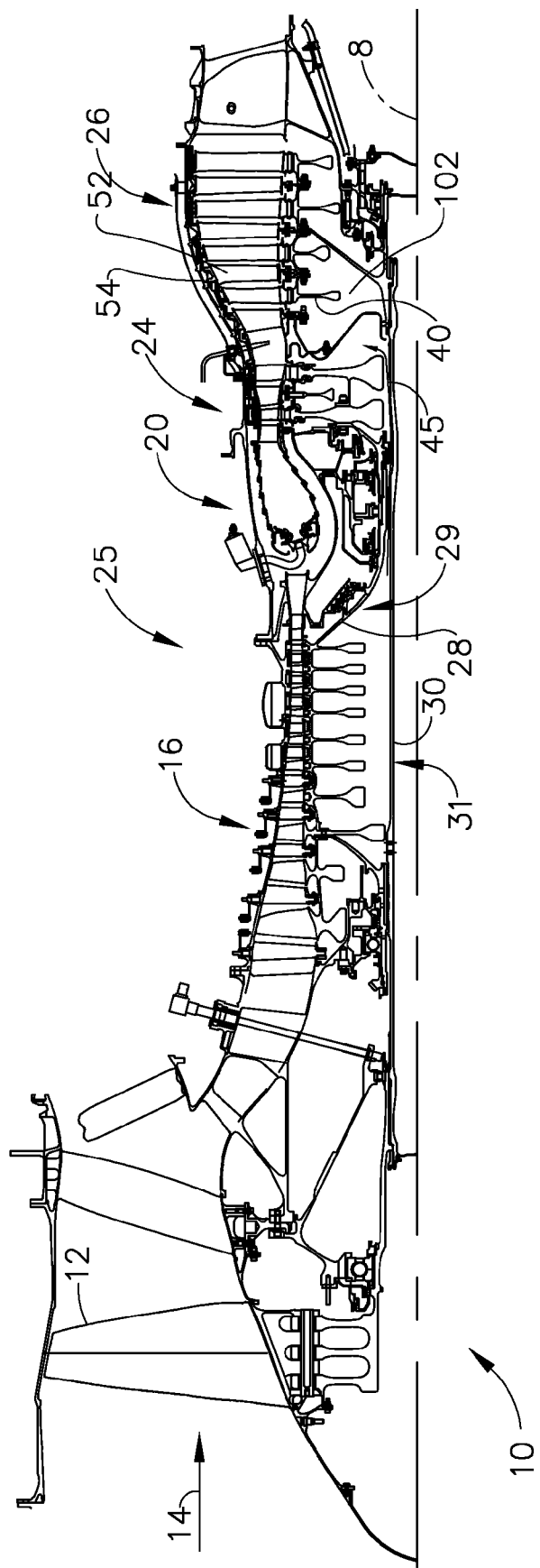
FIG. 1 is a longitudinal, sectional view illustration of exemplary embodiment of an aircraft turbofan gas turbine engine with a low pressure turbine including a cooled labyrinth seal.

Illustrated in FIG. 1 is an exemplary turbofan gas turbine engine 10 circumscribed about an engine centerline or axis 8 and having, in downstream serial flow relationship, a fan 12 which receives ambient air 14, a compressor 16, a combustor 20 which mixes fuel with the air 14 pressurized by the compressor 16 for generating combustion gases which flow downstream through a high pressure turbine (HPT) 24, and a low pressure turbine (LPT) 26 from which the combustion gases are discharged from the engine 10. A first or high pressure shaft 28 joins the HPT 24 to the compressor 16 to substantially form a first or high pressure rotor 29. A second or low pressure shaft 30 joins the LPT 26 to the fan 12 to substantially form a second or a low pressure rotor 31. The compressor 16, combustor 20, and high pressure turbine (HPT) 24 collectively are referred to as a core engine 25 which includes, for the purposes of this patent, the high pressure shaft 28. The second or low pressure shaft 30 which is at least in part rotatably disposed co-axially with and radially inwardly of the first or high pressure rotor.

Figure 2:
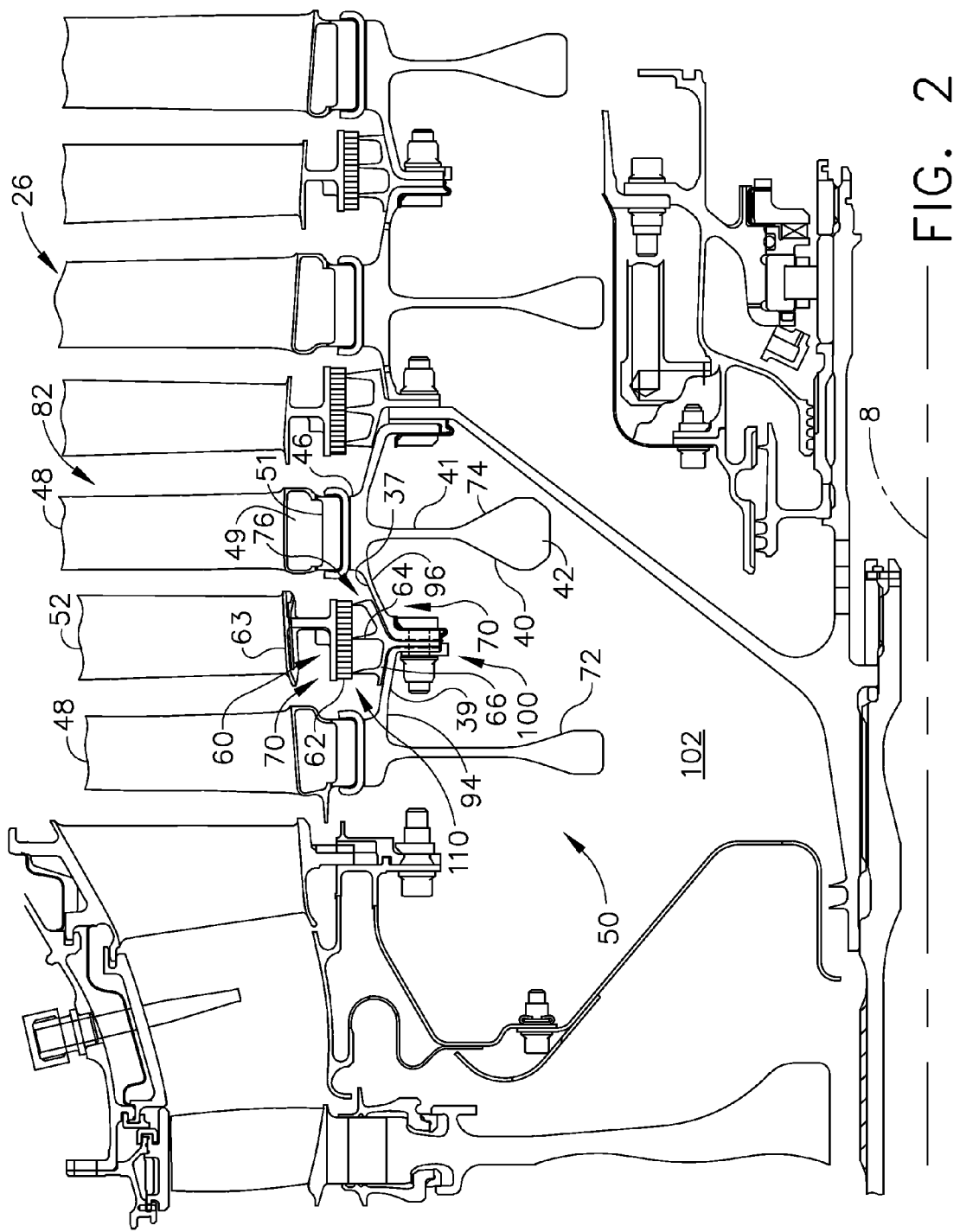
FIG. 2 is an enlarged view of the low pressure turbine illustrated in FIG. 1.

Referring further to FIG. 2, the low pressure turbine (LPT) 26 includes a plurality of rotor disks 40 and each rotor disk 40 has a hub 42 and a web 41 extending radially outwardly from the hub 42 to a disk rim 46 which defines a perimeter of the rotor disk 40. Each rotor disk 40 supports a row of turbine blades 48, each turbine blade 48 including a dovetail-shaped root portion 49 supported in a slot 51 in the disk rim 46. The turbine blades 48 extend radially outwardly from the disk rim 46. Stationary rows of vanes 52 extend radially inwardly from case 54 (illustrated in FIG. 1) in-between the rows of rotatable turbine blades 48. Adjacent first and second disks 72, 74 of the rotor disks 40 are connected by disk forward and aft spacer arms 39, 37 attached to the first and second disks 72, 74 respectively.

Figure 3:
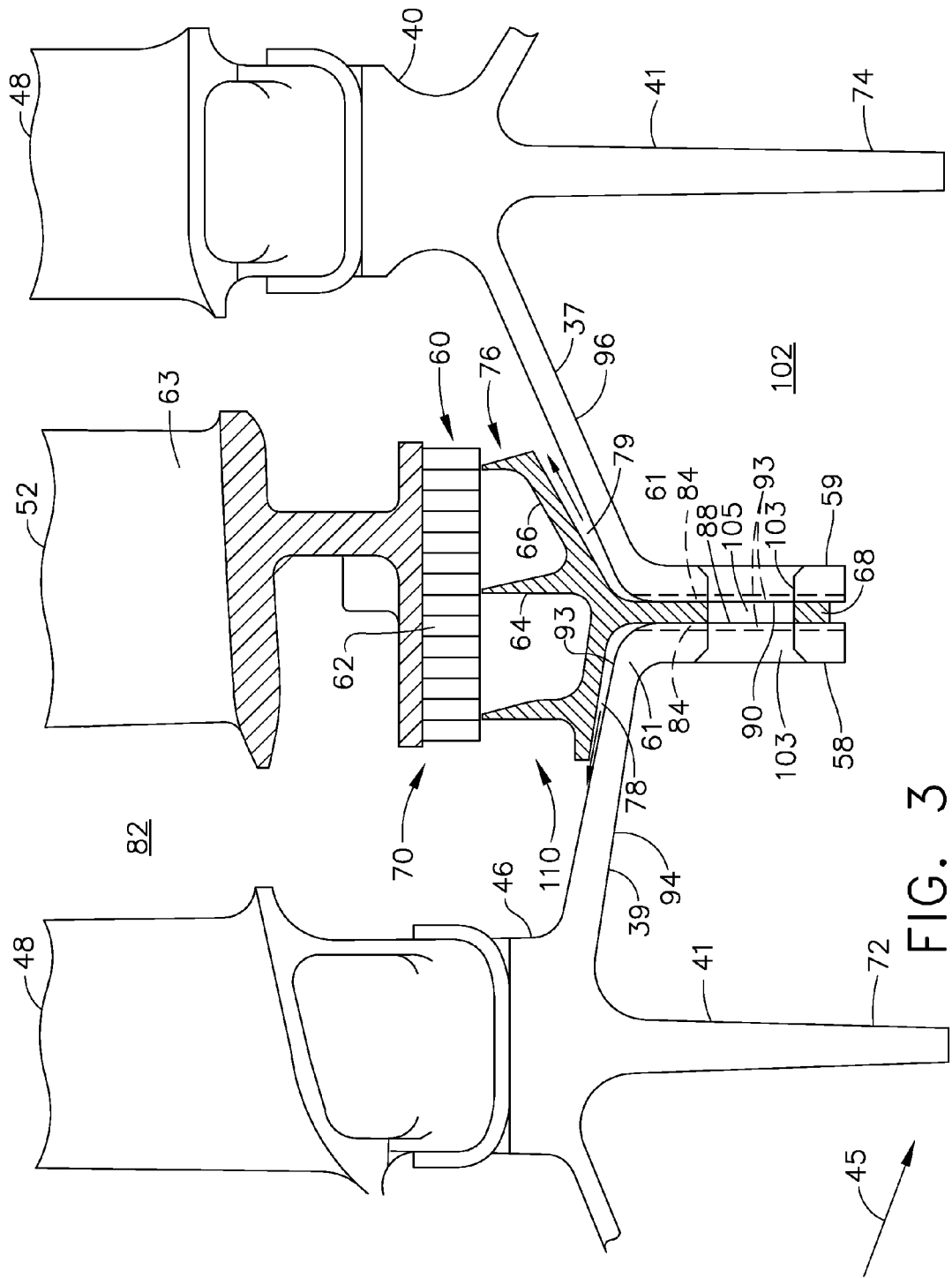
FIG. 3 is an enlarged view of the cooled labyrinth seal illustrated in FIG. 2 with bolts removed.
Figure 4:
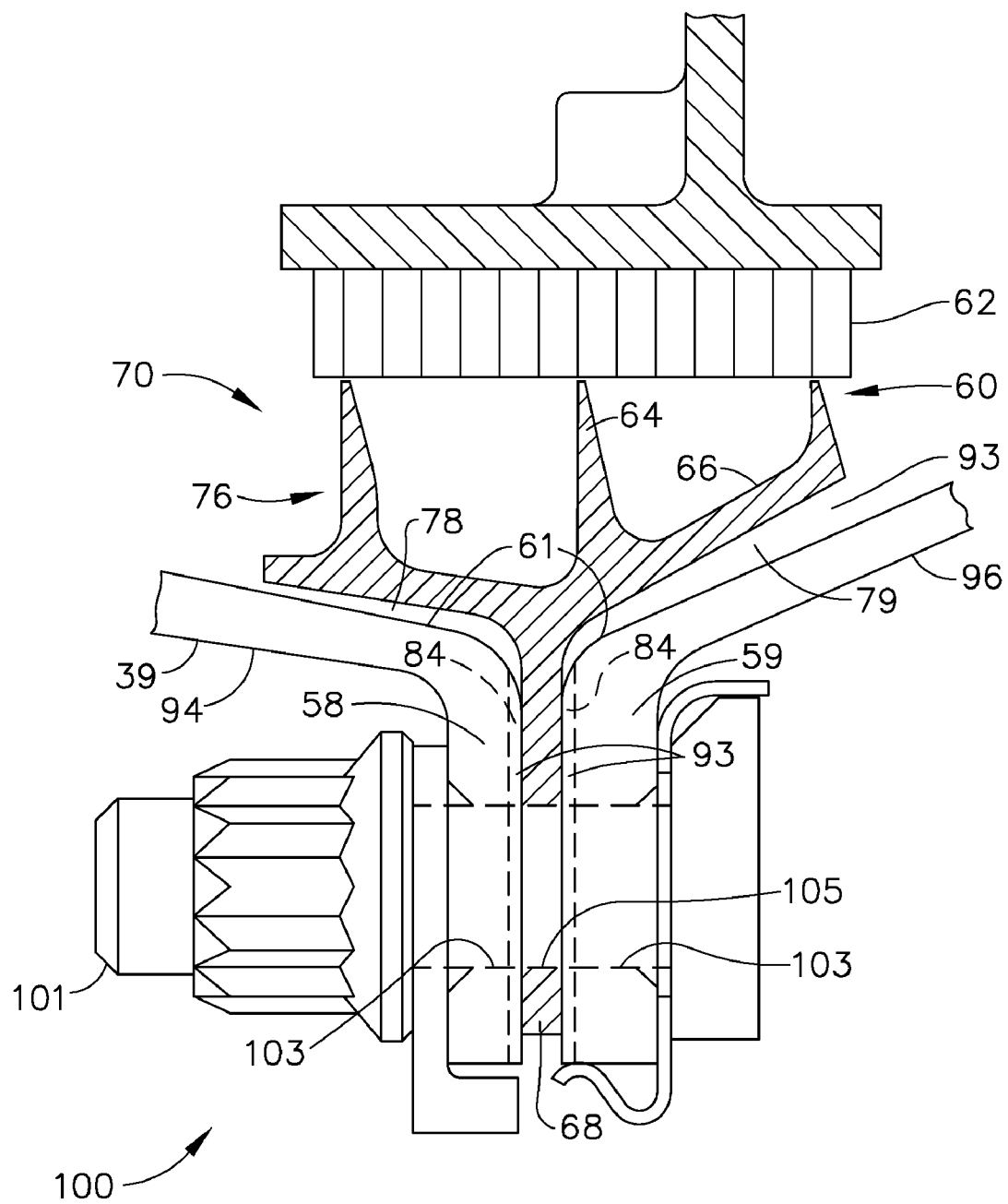
FIG. 4 is an enlarged view of the cooled labyrinth seal illustrated in FIG. 2 with the bolts installed.

Further referring to FIGS. 3 and 4, the arms are integrally formed as one piece with or rigidly connected to the disk rim 46 or web 41 of the first and second disks 72, 74 and transmit bending moments between the adjacent disks. A bore 102 is disposed radially inwardly of the hubs 42 and the forward and aft spacer arms 39, 37. The bore 102 is in flow communication with a source of cooling air 45 such as the compressor 16.

In the exemplary embodiment of the adjacent first and second rotor disks 72, 74 illustrated herein, the forward and aft spacer arms 39, 37 are integrally formed as one piece with the adjacent disks and bolted together with bolted connections 100 to form a low pressure turbine disk assembly 50 of the low pressure turbine (LPT) 26 as more particularly illustrated in FIGS. 2 and 4. The forward and aft spacer arms 39, 37 extend axially forwardly and aftwardly, respectively, away from the disk rims 46. Annular forward and aft flanges 58, 59 are located at distal ends 61 of the forward and aft spacer arms 39, 37. Adjacent forward and aft spacer arms 39, 37 are bolted together with the bolted connections 100 having bolts 101 through arm flange apertures 103 in the forward and aft flanges 58, 59 as more particularly illustrated in FIG. 3.

FIGS. 2, 3, and 4 illustrates a rim seal assembly 70 including a labyrinth seal 60 with annular seal teeth 64 in sealing relationship with an annular seal land 62. The annular seal land 62 is mounted to a radially inner end 63 of one of the stationary row of vanes 52 and the seal teeth 64 extend radially outwardly from and are mounted on an annular platform 66. An annular platform flange 68 extends radially inwardly from the platform 66. The rim seal assembly 70 further includes the platform flange 68 disposed between and bolted or otherwise connected to the forward and aft flanges 58, 59 of the adjacent forward and aft spacer arms 39, 37. Seal flange apertures 105 in the platform flange 68 are aligned with the arm flange apertures 103 in the forward and aft flanges 58, 59 and the bolts 101 are disposed through the seal flange apertures 105 and the arm flange apertures 103.

Figure 5:
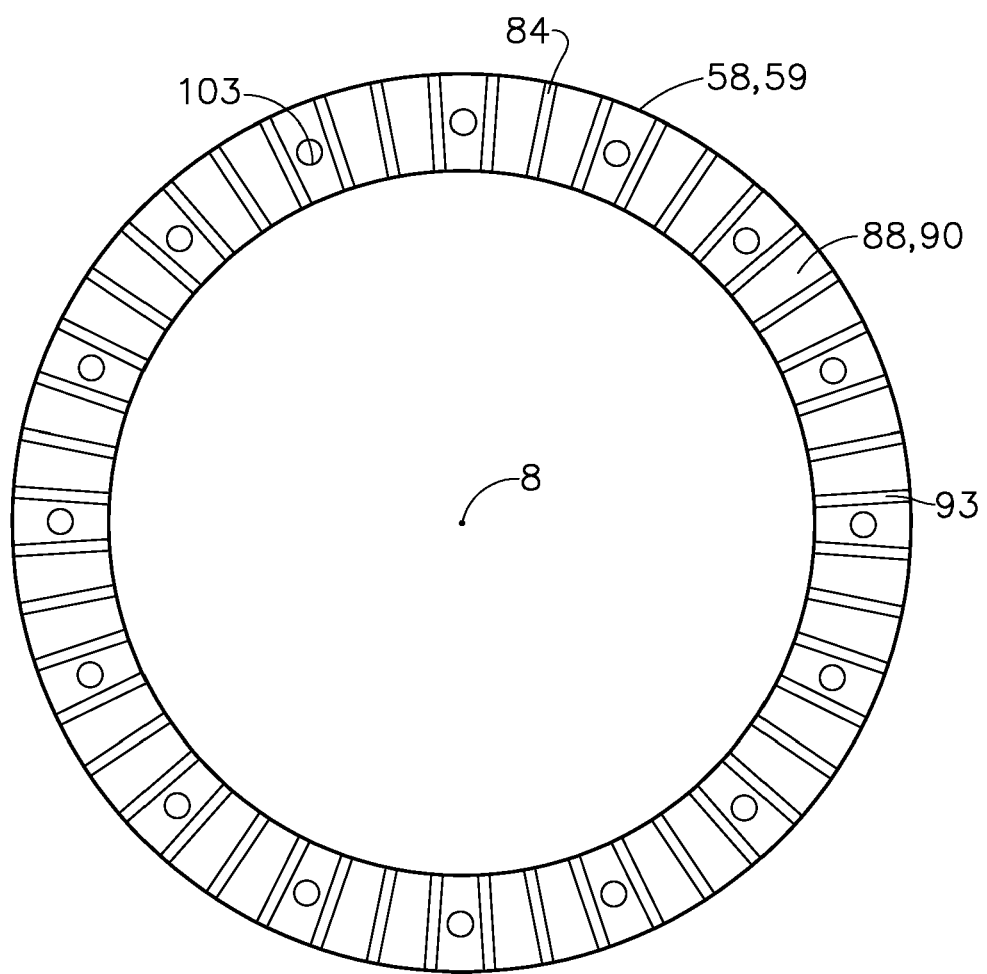
FIG. 5 is a diagrammatic view of cooling slots in arm flanges of disks in the low pressure turbine illustrated in FIG. 3.

Annular forward and aft outer rim cavities 78, 79 radially disposed between the forward and aft spacer arms 39, 37 and the platform flange 68 are axially separated by the annular platform 66. The labyrinth seal 60 is used to control and prevent leakage flow from a turbine primary flowpath 82 across which the turbine blades 48 and vanes 52 are radially disposed. However, some leakage does occur through the labyrinth seal 60. This leakage air includes extremely hot gases from the products of combustion. This high temperature air in the forward and aft outer rim cavities 78, 79 is extremely undesirable, having adverse effect on the rotor disks 40 and other parts of the turbine and engine. Cooling slots 84 extend radially across axially facing forward and aft surfaces 88, 90 of the forward and aft flanges 58, 59 as further illustrated in FIG. 5. The cooling slots 84 together with the platform flange 68 form radially extending cooling passages 93 therebetween allowing cooling air 45 to flow from the bore 102 of the LPT through the forward and aft outer rim cavities 78, 79 thus purging them of hot turbine air and cooling the cavities and the labyrinth seal teeth 64.

The labyrinth seal 60 is one example of a rim seal 110 in a rim seal assembly 70 for that may incorporate the cooling slots 84 extending radially across the axially facing forward and aft surfaces 88, 90 of the forward and aft flanges 58, 59 which support a platform flange of the rim seal. Such rim seals may be found in other parts of the gas turbine engine such as the turbines and compressors. The rim seal assembly 70 disclosed herein may generally be described as having an annular seal element 76 mounted on an annular platform 66 wherein the seal element is exemplified by the seal teeth 64. The forward and aft flanges 58, 59 may be located at distal ends 61 of forward and aft annular elements 94, 96 which are exemplified as the forward and aft spacer arms 39, 37 respectively.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A rim seal assembly comprising:
   an annular seal element circumscribing an engine centerline or axis and mounted on an annular platform,
   an annular platform flange extending radially inwardly from the platform,
   the platform flange disposed between and connected to forward and aft flanges at distal ends of forward and aft annular elements respectively,
   annular forward and aft outer rim cavities radially disposed between the forward and aft annular elements and the platform are axially separated by the platform flange, and
   cooling slots extending radially across axially facing forward and aft surfaces of the forward and aft flanges.

2. A rim seal assembly as claimed in claim 1, further comprising the platform flange and the forward and aft flanges being bolted together.

3. A rim seal assembly as claimed in claim 2, further comprising the annular seal element being seal teeth.

4. A rim seal assembly as claimed in claim 3, further comprising the seal teeth in sealing relationship with an annular seal land.

5. A rim seal assembly comprising:
   an annular seal element circumscribing an engine centerline or axis and mounted on an annular platform,
   an annular platform flange extending radially inwardly from the platform,
   the platform flange disposed between and connected to forward and aft flanges at distal ends of forward and aft annular elements respectively of a high pressure rotor or a low pressure rotor,
   annular forward and aft outer rim cavities radially disposed between the forward and aft annular elements and the platform are axially separated by the platform flange, and
   cooling slots extending radially across axially facing forward and aft surfaces of the forward and aft flanges.

6. A rim seal assembly as claimed in claim 5, further comprising the platform flange and the forward and aft flanges being bolted together.

7. A rim seal assembly as claimed in claim 6, further comprising the annular seal element being seal teeth.

8. A rim seal assembly as claimed in claim 7, further comprising the seal teeth in sealing relationship with an annular seal land.

9. A gas turbine engine turbine disk assembly comprising:
   at least one pair of adjacent first and second rotor disks connected by disk forward and aft spacer arms attached to the adjacent first and second rotor disks respectively,
   at least one rim seal assembly including an annular seal element circumscribing an engine centerline or axis and mounted on an annular platform,
   an annular platform flange extending radially inwardly from the platform,
   the platform flange disposed between and connected to forward and aft flanges at distal ends of the forward and aft spacer arms respectively,
   annular forward and aft outer rim cavities radially disposed between the forward and aft spacer arms and the platform are axially separated by the platform flange, and
   cooling slots extending radially across axially facing forward and aft surfaces of the forward and aft flanges.

10. A gas turbine engine turbine disk assembly as claimed in claim 9, further comprising the platform flange and the forward and aft flanges being bolted together.

11. A gas turbine engine turbine disk assembly as claimed in claim 10, further comprising the annular seal element being seal teeth.

12. A gas turbine engine turbine disk assembly as claimed in claim 11, further comprising the seal teeth in sealing relationship with an annular seal land.

13. A gas turbine engine turbine disk assembly comprising:
    a plurality of rotor disks,
    each of the rotor disks including a web extending radially outwardly from a hub to a disk rim,
    the plurality of rotor disks including at least one pair of adjacent first and second rotor disks connected by disk forward and aft spacer arms attached to the adjacent first and second rotor disks respectively,
    turbine blades extending radially outwardly from the disk rim of the adjacent first and second rotor disks,
    a row of vanes extending radially inwardly from a case and disposed axially between the turbine blades of the adjacent first and second rotor disks,
    an annular seal land mounted to a radially inner end of the row of vanes,
    at least one rim seal assembly including an annular seal element circumscribing an engine centerline or axis and mounted on an annular platform,
    the annular seal element in sealing relationship with the annular seal land,
    an annular platform flange extending radially inwardly from the platform,
    the platform flange disposed between and connected to forward and aft flanges at distal ends of the forward and aft spacer arms respectively,
    annular forward and aft outer rim cavities radially disposed between the forward and aft spacer arms and the platform are axially separated by the platform flange, and
    cooling slots extending radially across axially facing forward and aft surfaces of the forward and aft flanges.

14. A gas turbine engine turbine disk assembly as claimed in claim 13, further comprising a bore disposed radially inwardly of the hub and the forward and aft spacer arms and in flow communication with a source of cooling air.

15. A gas turbine engine turbine disk assembly as claimed in claim 14, further comprising the turbine blades and the row of vanes extending radially across a low pressure turbine primary flowpath.

16. A gas turbine engine turbine disk assembly as claimed in claim 15, further comprising the source of cooling air being a compressor.

17. A gas turbine engine comprising:
in downstream serial flow relationship, a fan, a compressor, a combustor, a high pressure turbine, and a low pressure turbine,
a plurality of rotor disks in the low pressure turbine,
each of the rotor disks including a web extending radially outwardly from a hub to a disk rim,
the plurality of rotor disks including at least one pair of adjacent first and second rotor disks connected by disk forward and aft spacer arms attached to the adjacent first and second rotor disks respectively,
turbine blades extending radially outwardly from the disk rim of the adjacent first and second rotor disks,
a row of vanes extending radially inwardly from a case and disposed axially between the turbine blades of the adjacent first and second rotor disks,
an annular seal land mounted to a radially inner end of the row of vanes,
at least one rim seal assembly including an annular seal element circumscribing an engine centerline or axis and mounted on an annular platform,
the annular seal element in sealing relationship with the annular seal land,
an annular platform flange extending radially inwardly from the platform,
the platform flange disposed between and connected to forward and aft flanges at distal ends of the forward and aft spacer arms respectively,
annular forward and aft outer rim cavities radially disposed between the forward and aft spacer arms and the platform are axially separated by the platform flange, and
cooling slots extending radially across axially facing forward and aft surfaces of the forward and aft flanges.

18. A gas turbine engine turbine disk assembly as claimed in claim 17, further comprising a bore disposed radially inwardly of the hub and the forward and aft spacer arms and in flow communication with a source of cooling air.

19. A gas turbine engine turbine disk assembly as claimed in claim 18, further comprising the turbine blades and the row of vanes extending radially across a low pressure turbine primary flowpath.

20. A gas turbine engine turbine disk assembly as claimed in claim 19, further comprising the source of cooling air being a compressor.

* * * * *